Nov. 29, 1960 E. C. HARTLEY 2,961,713
MOLDING OF O-RINGS AND THE LIKE
Filed May 9, 1957 2 Sheets-Sheet 1
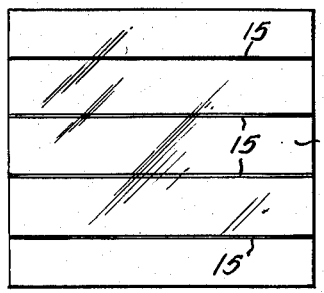
Fig. 1
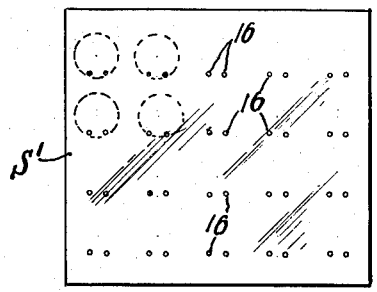
Fig. 2
Fig. 3
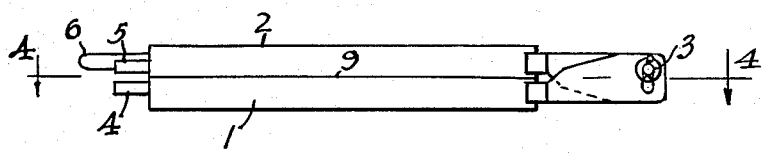
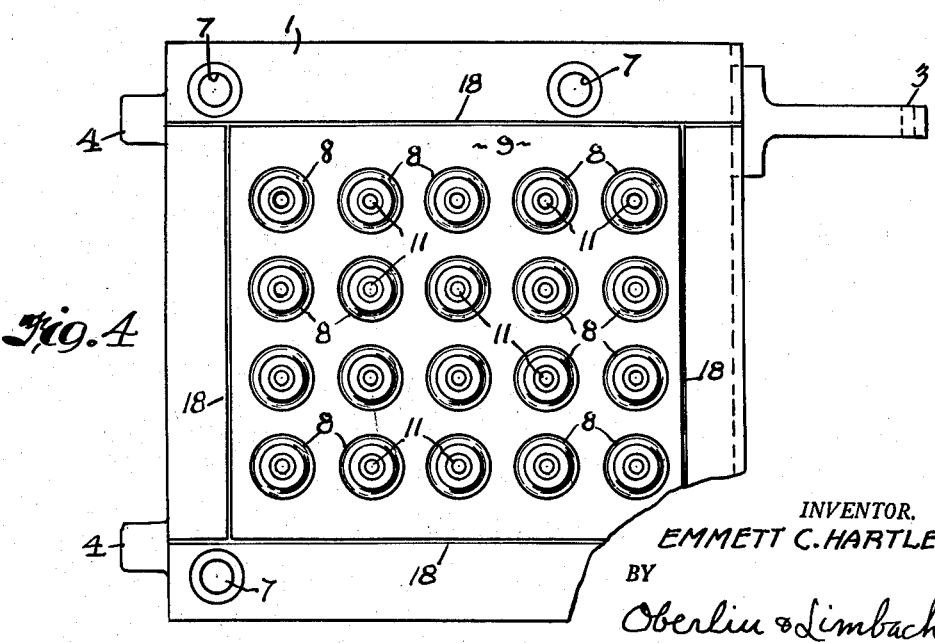
Fig. 4
INVENTOR.
EMMETT C. HARTLEY
BY
Oberlin & Limbach
ATTORNEYS.

Nov. 29, 1960 — E. C. HARTLEY — 2,961,713
MOLDING OF O-RINGS AND THE LIKE
Filed May 9, 1957 — 2 Sheets-Sheet 2
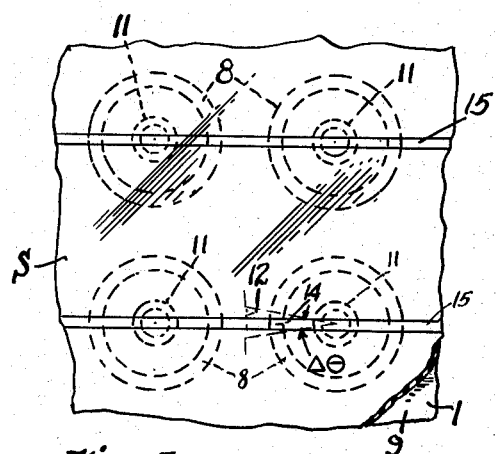
Fig. 5
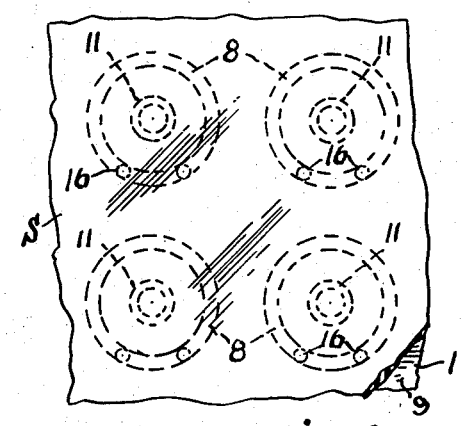
Fig. 6
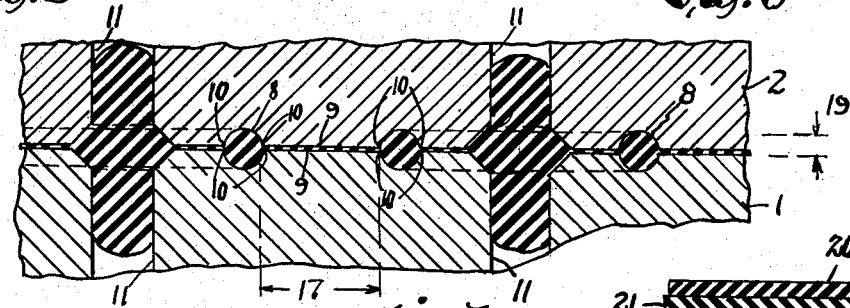
Fig. 7
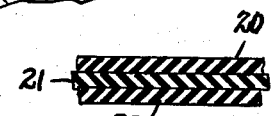
Fig. 8
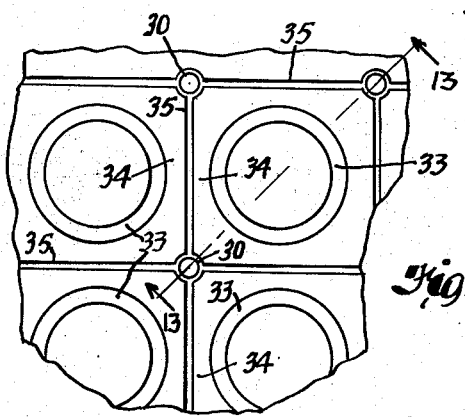
Fig. 12
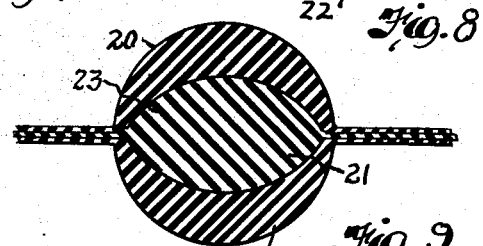
Fig. 9
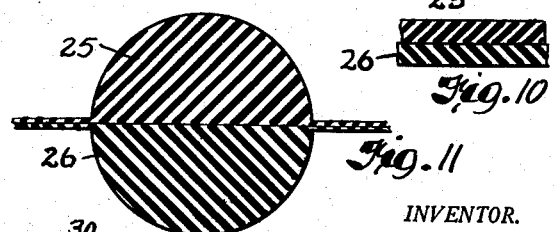
Fig. 10 / Fig. 11
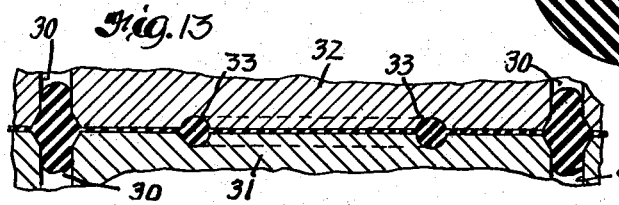
Fig. 13
INVENTOR.
EMMETT C. HARTLEY
BY
Oberlin & Limbach
ATTORNEYS.

United States Patent Office 2,961,713
Patented Nov. 29, 1960

2,961,713

MOLDING OF O-RINGS AND THE LIKE

Emmett C. Hartley, Euclid, Ohio, assignor to Parker-Hannifin Corporation, Cleveland, Ohio, a corporation of Ohio Filed May 9, 1957, Ser. No. 658,117

1 Claim. (Cl. 18—55)

The present invention while indicated as relating to molding of O-rings and the like is, in its broader aspects, concerned with the molding of annular articles from elastomeric material.

Hitherto, a prevalent practice in the art of molding O-rings has been to click out rings from uncured sheet stock which is thicker than the radial cross-section diameter of the rings to be formed therefrom, such clicked-out, uncured rings being placed into mold cavities and there shaped and cured by application of heat and pressure, the excess stock being squeezed out between the mating mold sections.

Other expedients well known in the art involve the forming of uncured rings from extruded string or rope or from extruded tubing, but, again, the axial cross-section dimensions of the uncured rings are greater than the cross-section diameters of the O-rings to be made therefrom, whereby, upon application of heat and pressure as before, the excess material is squeezed out of the mold cavities.

One drawback of the foregoing procedures is the great amount of time required to load the molds, and furthermore, added equipment is required for clicking out rings from sheet stock or for extruding rope or tubing from which rings are to be made.

Another drawback of the foregoing procedures is the expense and annoyance of applying colored identification markings individually either on the cured rings or on the uncured rings in the molds. When colored dots are painted on the uncured rings in the molds, such painted dots are apt to be smeared and displaced during the shaping operation. Aside from this, time is wasted in the dotting of those rings which do not pass inspection. It has been proposed to apply the colored dots to the cured rings but, then, other problems are encountered, such as the adherence of the paint, the flexibility of the paint, the thickness of the paint affecting the sealing characteristics of the ring, etc.

With the foregoing in mind, it is a principal object of this invention to provide a molding technique which is radically different from known techniques and by which superior packing rings are economically produced.

Another object of this invention is to provide a novel technique for the color coding of packing rings at the pre-cure stage with assurance that the cured rings will be properly and clearly marked so as to identify the fluid or fluids with which said rings may be employed.

Another object of this invention is to provide a molding technique by which laminated packing rings or the like, may be economically and efficiently produced, such laminated packing rings having opposite sides of different colors or different compositions or having cores of one material and outside portions or sheaths of different colors or of different compositions.

Yet another object of this invention is to provide a molding technique by which O-rings or the like are formed directly from uncured calendered sheet stock that is loaded into a mold without preliminary clicking or other operations thereon and which stock is of thickness but a minor fractional portion of the cross-section diameter of the rings to be formed therefrom.

Other objects and advantages of the present invention will become apparent as the following description proceeds.

Broadly stated, the present method is concerned with molding of articles from elastomeric sheet which comprises: (a) providing complementary mold sections that define between the mating faces thereof a mold cavity and a vent that is spaced to one side of said cavity; (b) placing a sheet of elastomeric material between said mold sections in a position such that a portion of the sheet that lies on the opposite side of the cavity has, together with the material that overlies the cavity, a volume exceeding that of the cavity, and (c) displacing that portion of the material on said opposite side of the cavity into and through the cavity and toward the vent until only a thin film of the sheet material remains between the mating faces of the mold sections. In this way, the mold cavity is filled under the influence of the back pressure built up in the material between the ever decreasing thickness of the space between the portions of the mating faces that are disposed between the mold cavity and the vent. Similarly, broadly stated, the apparatus is so constructed as to perform the foregoing method.

To the accomplishment of the foregoing and related ends, said invention, then comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

In said annexed drawings:

Fig. 1 is a plan view of a thin sheet of elastomeric material, such as synthetic rubber, having painted thereon parallel stripes of color identifying the fluid or fluids with which the rings molded from said sheet may be used;

Fig. 2 is also a plan view of a thin sheet of elastomeric material that has rows of colored dots painted thereon for fluid identification instead of the parallel stripes as shown in Fig. 1;

Fig. 3 is a side elevation view of a two-part mold in which the uncured sheet of Figs. 1 or 2 is adapted to be inserted and there formed, by heat and pressure, into a plurality of packing rings;

Fig. 4 is a top plan view of the bottom mold section showing the mold cavities therein;

Fig. 5 is a fragmentary plan view showing the sheet of Fig. 1 positioned on the bottom mold section;

Fig. 6 is a similar fragmentary plan view showing the sheet of Fig. 2 positioned on the bottom mold section;

Fig. 7 is a fragmentary cross-section view, on enlarged scale, taken in a vertical plane passing through the axes of adjacent cavities of the closed mold;

Fig. 8 is a fragmentary cross-section view of a modified form of sheet comprising three superimposed layers;

Fig. 9 shows in cross-section the O-ring produced from the composite sheet of Fig. 8;

Fig. 10 is a fragmentary cross-section view showing two superimposed sheets of different compositions or different colors;

Fig. 11 shows in cross-section the O-ring produced from the composite sheet of Fig. 10;

Fig. 12 is a top plan view of a portion of the bottom mold section of another embodiment of this invention; and Fig. 13 is a cross-section view taken substantially along the line 13—13, Fig. 12.

At the outset, it should be made clear that, although the present invention is hereinafter described in connection with the forming of O-rings, annuli or packing rings of other than circular radial cross-section may be produced. As a matter of cost reduction, packing rings, especially those of the usual small size, are molded in multiple cavity molds as herein described, but it is to be understood that the principles of the invention are applicable to single cavity molds as well. Another point that should be made clear is that while a single two-part mold has been shown herein, the usual practice is to stack several such molds in a molding press to effect curing and shaping with a single application of heat and pressure.

Referring first to Figs. 3 and 4, the mold there shown is of more or less conventional form including mating bottom and top mold sections 1 and 2 that are hinged together at 3 and that are formed with lugs 4 and 5 to assist in prying apart of said sections. The top mold section 2 is provided with a lifting handle 6 by which the mold may be opened for unloading and loading. Said mold sections 1 and 2 are provided with interfitting locating means (herein pins, not shown, of mold section 2 fitting in bores 7 of mold section 1) so that when said mold sections are brought together under pressure, the respective mating cavities will be in register so as to define cavities 8 that are the counterparts of the finished articles. In the present case, the cavities 8 are of circular transaxial and radial cross-section for molding O-rings. Fig. 4 is a top plan view of the bottom mold section 1 which has formed therein, the bottom semi-circular radial cross-section halves of a plurality of such O-ring cavities 8.

The cavity halves in the respective mold sections 1 and 2 preferably intersect the mating plane faces 9 of the mold sections in sharp, unbroken corners 10, and the cavities 8 are preferably dimensioned so that the O-rings formed therein will have truly circular radial cross-sections when said faces 9 are together or spaced apart only a small distance such as .002".

Spaced within each cavity 8 is a vent hole 11 in the respective mold sections 1 and 2, such vent holes 11 preferably being countersunk as shown.

An important feature of this invention is that the nearest portions of adjacent cavities 8 must have an excess of material therebetween to insure complete filling of the cavities 8 (without circumferential flow of the material in the cavities) as the mold sections are pressed together against a sheet of the uncured stock therebetween. In other words, as best shown in Fig. 5, for example, the portion 12 of the elemental segment of sheet stock S of angle $\Delta\theta$ outside of the cavity 8 should have a volume greater than that of the portion 14 of angle $\Delta\theta$ of the cavity 8 itself. Therefore, as the mold sections 1 and 2 are brought together, the material outside the respective cavities 8 is confined to flow directly radially inward through the respective cavities 8 into the respective vent holes 11, and as such flow takes place the pressure progressively builds up inward of the cavities 8 and in the cavities 8 themselves, this apparently accounting for the 5-10% increase in the specific gravity of the O-rings produced by this method.

As a general rule of thumb, such minimum dimension between adjacent cavities 8 should be at least three times the radial cross-section diameters of the cavities when the sheet stock has a thickness that is from about 25 to 60% of such radial cross-section diameter. It is also desirable to provide a similar minimum distance inside each cavity 8 to the edge of the countersunk vent hole 11.

As before mentioned, the molding technique herein disclosed comprises providing a sheet of uncured stock which is of thickness from about 25 to 60% of the radial cross-section diameters of the cavities 8, and in the Fig. 1 sheet S, the idnetification markings comprise parallel lines 15 painted on the sheet with paint having a base material compatible with the composition of the stock, a pigment, and a suitable solvent. As best shown in Fig. 5, such stripes 15, when the sheet S is placed on the bottom mold section 1, extend diametrically across the cavities 8. The Fig. 2 sheet S' has a series of paired dots 16 painted thereon and when said sheet S' is placed on the bottom mold section 1, the dots 16 preferably are disposed to one side of the center lines of the rows of cavities 8, as shown in Fig. 6.

In any event, whether the sheet be striped or dotted as in Figs. 1 and 2, the same is laid on the bottom mold section 1 whereupon the mold is closed and pressure and heat is applied to deform the sheet and to cause flow of the sheet material into and through the cavities 8 and into the respective vent-holes 11, as shown in Fig. 7. It has been found that when the mold sections 1 and 2 are initially pressed together, the material flows inward and outward with respect to the cavities 8 but, thereafter, the entire flow of the material is radially inward into and through the respective cavities and into the respective center vent-holes 11, such flow of the material serving additionally to purge the mold cavities 8. Moreover, as the mold sections 1 and 2 are pressed together, it has been found that the stock S or S' at the mold-stock interfaces is held in place whereby the stripes 15 or dots 16, as the case may be, remain in essentially the same places as when the sheets S or S' are initially loaded into the mold. The mold parts 1 and 2 are pressed together firmly until the stock between the parting line faces 9 is squeezed down to about .002" or less and preferably not more than about .0025". By adhering to the aforesaid minimum distances between the respective cavities 8, the flow of the stock is directly radially inward through the cavities 8 to completely fill the cavities with all of the excess, except the .002" thickness film or flash, disposed in the vent holes 11.

As apparent, the stock in sheet form is never disrupted or parted as it is in the case of that molding technique in which the material from a thick sheet is squeezed through openings leading peripherally into a mold cavity. In such case several streams must join or weld together in order to form a homogeneous ring. It has been found that by using the present technique, the rings have a specific gravity which is about 5 to 10% greater than that of the rings formed by known processes.

As a specific example of the present method, it is preferred to use an uncured sheet of .070" thickness when the radial cross-section diameter of each cavity 8 is .141" (for producing .139" nominal diameter rings). In this case, the uncured sheet S or S' was of thickness about one-half the thickness or radial cross-section diameter of the packing rings to be formed therefrom, and the distance 17 between adjacent cavities was about .420" while for rings of 1.000" inside diameter the vent hole was of $5/16$" diameter with a $1/2$" countersink diameter. The sheet S or S' of calendered, uncured Buna-N synthetic rubber to form O-rings of 70 Durometer hardness was 20" square to fit inside the $1/16$" x $1/16$" overflow grooves 18 of mold sections 1 and 2. The stock was preheated (preferably 180° F., but between about 160° and 200° F.), whereas the mold sections 1 and 2 were heated to a temperature of about 320° F. as the stock was squeezed therebetween.

In this case, the colored identification markings consisted of a Buna-N paint with pigment and solvent. The .070" Buna-N sheet, preheated as above indicated, and then further heated to 320° F. was squeezed down to a film thickness of about .002" between plane faces 9 of said mold sections 1 and 2, the curing time in this case being about 6 to 12 minutes, whereafter the formed sheet was removed from the mold. Because of the thinness of the flash, the same may be readily removed by well-known techniques.

The cured and shaped rings formed by this method are properly marked, there not being any noticeable flow of the opposite skins of the sheet S or S' whereby the painted stripes 15 or dots 16, as the case may be, when originally in register with the packing ring cavities 8 will be so in register in the final product, without objectionably smearing.

Referring to Fig. 7 which is an enlarged cross-section view through the mold showing adjacent cavities 8, the original uncured sheet is preferably of thickness about 25 to 60% of the cross-section diameter of the O-rings to be formed therefrom. In said Fig. 7, the dotted line 19 designates the original thickness of the sheet of uncured stock and as apparent, as the mold sections are brought together, the material between the skins of the sheet stock, is extruded radially inward toward the vent holes 11 of each of the cavities 8 and, as a result, when the material thus flows radially inwardly and converges, there is built up a progressively increasing back pressure that insures complete filling of each of the cavities and with the excess flowing into the vent holes.

This is in contradistinction to conventional molding procedures wherein excess stock in the mold cavities is primarily squeezed radially outward and often, in the known methods, the inside diameter of the cavity 8 is defined by a pin on one mold section that fits into a hole in the other mold section to punch out a center slug, whereby the material must flow radially outward and in so doing it is impossible to accurately control the flash thickness to close limits. In other words, the amount of material in a .002" thickness flash is so little as compared with the amount of material in the cavities that mere tolerance variations in the thickness of the sheet stock will result either in incomplete filling of the cavities or else in so much excess stock that the flash thickness will be excessive to render stripping difficult and to impair the sealing properties of the deflashed rings, unless subjected to further finishing operations.

Referring now to Figs. 8 and 9, the former shows a laminated sheet comprising three layers 20, 21, and 22, which may be of any different colored or different composition materials, if desired. For instance, the middle layer 21 may be of white synthetic rubber and the top and bottom layers 20 and 22 may be of black synthetic rubber. For forming .141" cross-section rings, said layers may total .070" in thickness, each layer being, for example, about .023". When such laminated sheet is molded, the white middle layer 21 does not come through the top and bottom layers 20 and 22 anywhere even at the .002" thickness flash. The middle layer 21, as shown in Fig. 9, forms a core 23 inside the O-ring and, of course, when the flash is removed, there will be visible only a very faint white line (less than .001" in thickness) around the outside and inside diameters of the finished O-ring. The desirable properties of different compounds may thus be combined to provide, for example, a soft, resilient, and easily deformable core 23 with a harder low friction exterior. An infinite number of different combinations may be produced, including, but not restricted to, the use of alternate organic plastic and synthetic rubber layers.

Referring now to Figs. 10 and 11, there is shown a composite sheet composed of two layers 25 and 26 of elastic material which, when cured and shaped, will produce packing rings as shown in Fig. 11, having a cross-section made up of the composition of the top and bottom sheet layers 25 and 26, and it has been found that the parting line at which the two compositions are joined together extends across a diametral, transaxial plane of the O-ring. Again, the different compositions will not be mixed but instead will be distinct layers even at the thin .002" flash.

In conclusion, and by way of summary, it can be seen that the present invention makes possible the economical, efficient production of packing rings of elastomeric material. All that is required is a thin sheet of such material that is formed and cured between complementary mold sections by radial inward flow of the material through the ring-shaped cavities into central vents. In the case of O-rings, such thickness of the sheet is between 25 and 60% of the radial cross-section diameter of the cavities, the cavities being spaced apart to provide an excess of material at those zones of adjacent cavities that are closest to each other. In this way, the material between adjacent cavities can only flow radially inward through the respective cavities into the respective vents. The plane parting line faces of the mold sections also extend inward of the respective cavities to effect a progressive back pressure build-up in the cavities 8. If desired, the sheet S or S' may have center slugs punched out therefrom that preferably are of diameter less than the inside diameter of the respective cavities 8; however, in view of the original thinness of the sheet, the amount of uncured material thus saved for re-use is hardly worth the time and expense of punching out the slugs.

Referring now to Figs. 12 and 13, there is shown therein an embodiment of the invention in which the vents 30 of the mold sections 31 and 32 are located in spaced relation outside of the respective mold cavities 33. By so arranging the vents 30 the sheet material which is adapted to be placed between said mold sections 31 and 32 has portions thereof disposed inside the respective cavities 33 whereby, when the mold is closed, said inside portions are displaced outwardly into and through the respective cavities 33 and through the ever decreasing thickness of the space between those portions 34 of the mating faces of the mold sections 31 and 32 until the excess material finally reaches the vents 30. As shown herein, the vents 30 may be interconnected as by relief grooves or channels 35, which, if desired, may be of sufficient size to take the place of the vent holes 30. Moreover, said relief grooves 35 may be arranged concentrically around the respective cavities 33 but, in any case, it is preferred to maintain a minimum distance of about 3D between the edges of the vents 30 or channels 35 and the outer edges of the mold cavities 33 so that the required back pressure is created on the material therein as the thickness of the surrounding film approaches the desired .002 to .0025" previously referred to.

With further reference to said Figs. 12 and 13, the initial thickness of the elastomeric sheet will again be substantially less than the depths of the cavities 33, but sufficient so that the discs of material that are disposed inside of the respective cavities 33, together with the annular portions of the material that overlie the respective cavities 33, have volumes exceeding those of the respective cavities. Thus, the material inside the respective cavities 33 can only flow outward thereinto and therethrough and by reason of the build-up of pressure on the material outside of the cavities 33, they are purged and completely filled, all as previously explained in connection with the embodiments of the invention shown in Figs. 1 to 11 inclusive.

A characterizing feature of this invention is that a vent is provided on one side of each mold cavity in spaced relation thereto and that excess material is displaced from the opposite side of the cavity into and through the cavity on its way to the vent, a high back pressure being built up in the zone between the vent and the cavity. In Figs. 1 to 11 the vents 11 are disposed centrally within the respective cavities 8, into which vents, the excess material flows from the outside of the respective cavities and into and through the cavities, the required back pressure built up in the ever decreasing thickness spaces between the vents 11 and the insides of the respective cavities 8. On the other hand, in the embodiment of the invention illustrated in Figs. 12 and 13 the vents 30 are located outside of the respective cavities 33 while the material from the inside of the respective cavities is displaced into and through the cavities with the required back pressure being built up in the spaces between the cavities 33 and the vents 30.

Other modes of applying the principle of the invention may be employed, change being made as regards the details described, provided the features stated in the following claim, or the equivalent of such, be employed.

I therefore particularly point out and distinctly claim as my invention:

Molding of O-rings and the like comprising providing a separable mold having recessed plane faces which, when brought together, define a series of ring-shaped cavities and vents spaced radially inward from the respective cavities; inserting between such faces when the mold is open an elastomeric sheet of thickness from about 25 to 60% of the axial depth of such cavities and of size such that its perimeter is radially outward of such cavities and of a volume greater than that of said cavities; laterally squeezing such sheet in the mold thereby progressively displacing the material of the sheet that lies between adjacent cavities radially inward to fill such adjacent cavities while the excess material is displaced from such cavities radially inward toward such vents under the influence of progressively increasing back pressure due, in part, to thinning of the material between such cavities and vents; and continuing such displacement until only a thin film of material of less than about .0025" thickness remains outside such cavities; and stripping the thinned portions of the sheet from the portions filling such cavities to provide separate rings having the size and cross-section shape of such cavities.

References Cited in the file of this patent

UNITED STATES PATENTS

| | | |
|---|---|---|
| 2,072,349 | Wayne | Mar. 2, 1937 |
| 2,148,079 | Martin | Feb. 21, 1939 |
| 2,748,425 | Coffey | June 5, 1956 |